(12) United States Patent
Lee (10) Patent No.: US 11,945,656 B2
(45) Date of Patent: Apr. 2, 2024

(54) DOOR ASSEMBLY AND APPARATUS FOR COLLECTING OBJECTS COMPRISING THE SAME

(71) Applicant: Superbin Co., Ltd., Daejeon (KR)

(72) Inventor: Bbun Byul Lee, Seoul (KR)

(73) Assignee: Superbin Co., Ltd., Daejeon (KR)

( * ) Notice: Subject to any disclaimer, the term of this patent is extended or adjusted under 35 U.S.C. 154(b) by 0 days.

(21) Appl. No.: 17/858,409

(22) Filed: Jul. 6, 2022

(65) Prior Publication Data

US 2023/0382649 A1 Nov. 30, 2023

(30) Foreign Application Priority Data

May 30, 2022 (KR) ........................ 10-2022-0066399

(51) Int. Cl.
*B65G 21/10* (2006.01)
*B65G 35/06* (2006.01)

(52) U.S. Cl.
CPC ............. *B65G 21/10* (2013.01); *B65G 35/06* (2013.01)

(58) Field of Classification Search
CPC .................................. B65G 21/10; B65G 35/06
See application file for complete search history.

(56) References Cited

U.S. PATENT DOCUMENTS

| | | | | | |
|---|---|---|---|---|---|
| 2,571,664 | A | * | 10/1951 | Blum | F25D 23/02 49/69 |
| 4,944,234 | A | * | 7/1990 | Hesch | B61D 19/007 49/40 |
| 4,949,653 | A | * | 8/1990 | Rast | F23G 5/085 110/255 |
| 5,217,173 | A | * | 6/1993 | Koenig | F23G 5/448 110/232 |
| 5,263,425 | A | * | 11/1993 | Koenig | G21C 19/32 110/173 C |

FOREIGN PATENT DOCUMENTS

| | | | |
|---|---|---|---|
| KR | 101614782 B1 | * | 4/2016 |
| KR | 102235376 B1 | * | 4/2021 |
| WO | WO-2020262978 A2 | * | 12/2020 |

* cited by examiner

*Primary Examiner* — Gene O Crawford
*Assistant Examiner* — Abby A Jorgensen
(74) *Attorney, Agent, or Firm* — Dinsmore & Shohl LLP; Yongsok Choi, Esq.

(57) ABSTRACT

A door assembly is provided. The door assembly includes: a guide frame unit including a first guide track and a second guide track spaced apart from and disposed in parallel with the first guide track; an inner door disposed to be upwardly and downwardly movable along the first guide track and provided with a first locking part protruding in a first direction at a lower end; an outer door disposed to be upwardly and downwardly movable along the second guide track and provided with a second locking part protruding in a second direction from above a point at which the first locking part is formed; and a drive unit configured to move the inner door upwardly and downwardly, wherein the second locking part is formed to contact the first locking part as the inner door moves upwardly.

7 Claims, 9 Drawing Sheets

DOOR ASSEMBLY AND APPARATUS FOR COLLECTING OBJECTS COMPRISING THE SAME

CROSS-REFERENCE TO RELATED APPLICATION(S)

This application claims priority to Korean Patent Application No. 10-2022-0066399 filed on May 30, 2022, the entire contents of which are herein incorporated by reference.

FIELD OF THE INVENTION

The present invention relates to a door assembly and an object collection apparatus having the same.

BACKGROUND

In general, an object collection apparatus used in waste disposal industry has doors each disposed in a front part and a rear part of a main body. As with the technology disclosed in Korean Registered Patent Publication No. 10-2235376, such a door may be configured to open and close as the door moves upwardly and downwardly, but there is a problem that the safety of the door configured in the shape of a guillotine is very low.

For example, a user's hand may get pinched under the door when the door moves downwardly, but the door may still move downwardly to reach a predetermined position with the user's hand being pinched. That is, since a driving force for moving the door downwardly continues to move the door downwardly even with the user's hand being pinched, there is a high possibility of irreparable damage to the user, such as the user's hand being cut.

SUMMARY OF THE INVENTION

One object of the present invention is to solve all the above-described problems in the prior art.

Another object of the invention is to allow a user to easily remove his/her hand from under a door in the shape of a guillotine by applying a force in a direction opposite to the door's direction of movement even when the user's hand is pinched under the door.

The representative configurations of the invention to achieve the above objects are described below.

According to one aspect of the invention, there is provided a door assembly comprising: a guide frame unit including a first guide track and a second guide track spaced apart from and disposed in parallel with the first guide track; an inner door disposed to be upwardly and downwardly movable along the first guide track and provided with a first locking part protruding in a first direction at a lower end; an outer door disposed to be upwardly and downwardly movable along the second guide track and provided with a second locking part protruding in a second direction from above a point at which the first locking part is formed; and a drive unit configured to move the inner door upwardly and downwardly, wherein the second locking part is formed to contact the first locking part as the inner door moves upwardly.

According to another aspect of the invention, there is provided an object collection apparatus having a door assembly, comprising: a conveyance unit configured to form a path through which an object moves; a tunnel unit formed at an upper part of the conveyance unit to surround at least a part of the conveyance unit; and a plurality of door assemblies each of which is disposed at an inlet and an outlet of the tunnel unit to open and close the inlet and outlet of the tunnel unit, wherein the door assembly comprises: a guide frame unit including a first guide track and a second guide track spaced apart from and disposed in parallel with the first guide track; an inner door disposed to be upwardly and downwardly movable along the first guide track and provided with a first locking part protruding in a first direction at a lower end; an outer door disposed to be upwardly and downwardly movable along the second guide track and provided with a second locking part protruding in a second direction from above a point at which the first locking part is formed; and a drive unit configured to move the inner door upwardly and downwardly, and wherein the second locking part is formed to contact the first locking part as the inner door moves upwardly.

In addition, there are further provided other door assemblies or object collection apparatuses having the same according to the technical idea of the invention.

According to the invention, it is possible allow a user to easily remove his/her hand from under a door in the shape of a guillotine by applying a force in a direction opposite to the door's direction of movement even when the user's hand is pinched under the door.

DETAILED DESCRIPTION OF THE INVENTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the invention will be described in detail with reference to the accompanying drawings to enable those skilled in the art to easily implement the invention.

Configuration of an Object Collection Apparatus

Figure 1:
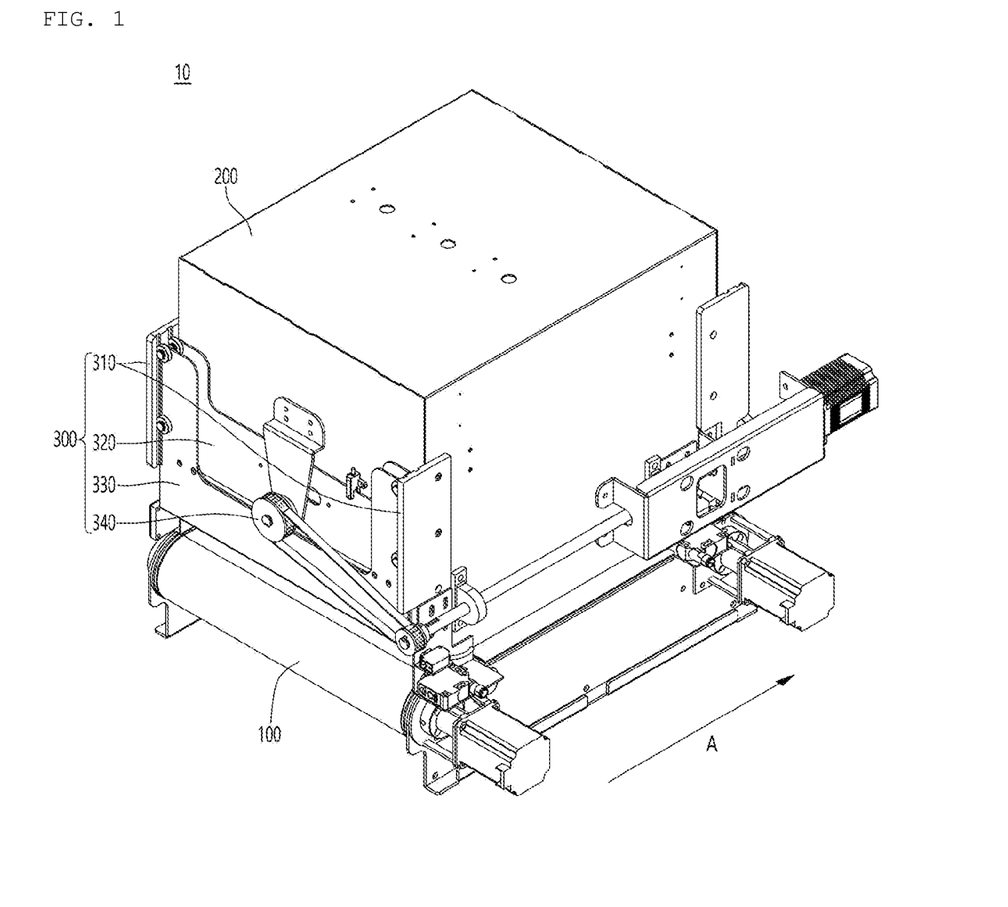
FIG. 1 illustrates an object collection apparatus according to one embodiment of the invention.
Figure 2:
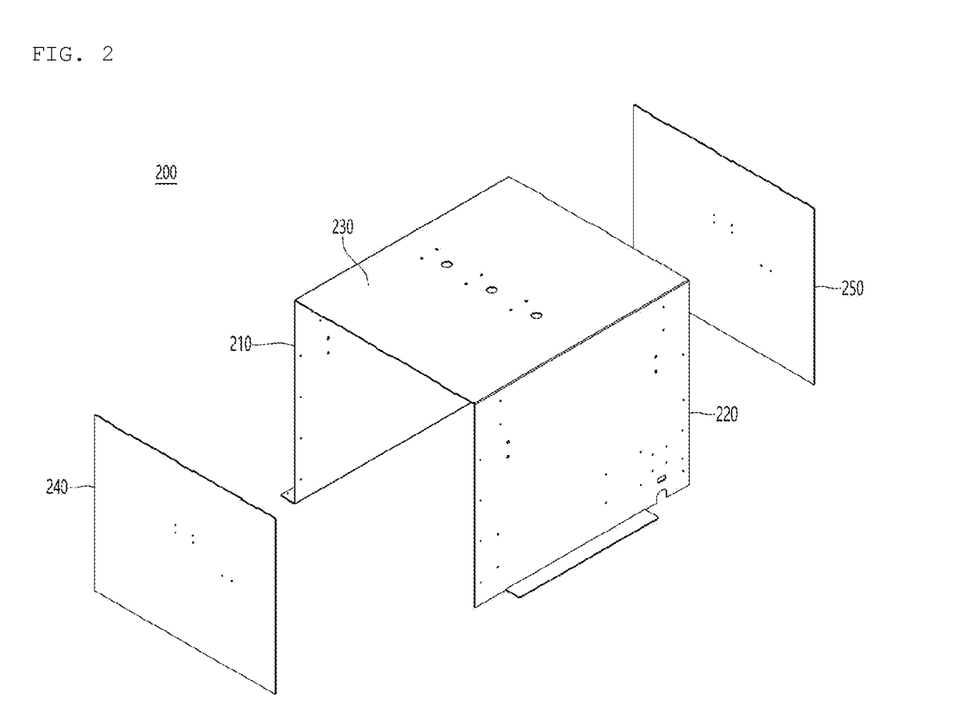
FIG. 2 is an exploded perspective view of a tunnel unit according to one embodiment of the invention.
Figure 3:
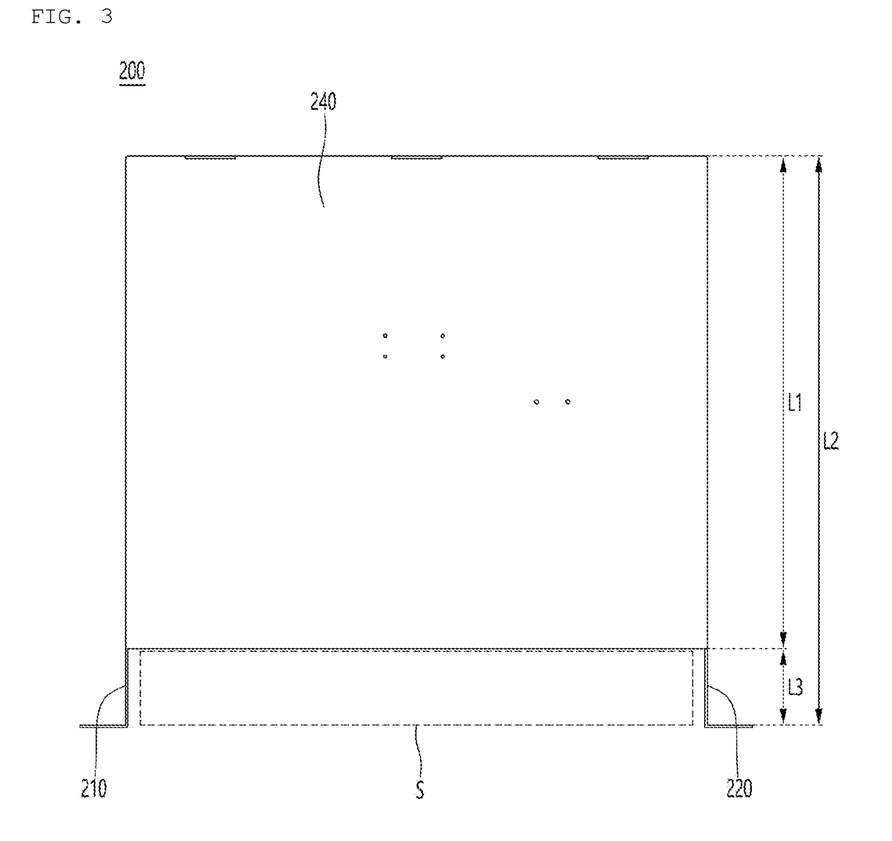
FIG. 3 is a front view of the tunnel unit according to one embodiment of the invention.

FIG. 1 illustrates an object collection apparatus 10 according to one embodiment of the invention, FIG. 2 is an exploded perspective view of a tunnel unit 200 according to one embodiment of the invention, and FIG. 3 is a front view of the tunnel unit 200 according to one embodiment of the invention.

Referring to FIG. 1, the object collection apparatus according to one embodiment of the invention may comprise a conveyance unit 100, a tunnel unit 200, and a door assembly 300.

First, the conveyance unit 100 according to one embodiment of the invention may form a path through which an object moves. Specifically, according to one embodiment of the invention, the conveyance unit 100 may be formed in the shape at least partially similar to a conventional conveyor, and the object may move from one point to another on the conveyance unit 100 according to the operation of the conveyance unit 100. Here, according to one embodiment of the invention, the direction in which the object moves on the conveyance unit 100 may be rearward of the object collection apparatus 10 (i.e., direction A in FIG. 1).

Next, the tunnel unit 200 according to one embodiment of the invention may be formed at an upper part of the conveyance unit 100 to surround at least a part of the conveyance unit 100 (see FIGS. 1 and 2).

For example, the tunnel unit 200 may be formed of five plates, and the five plates may form a left side, a right side, an upper side, a front side, and a rear side of the tunnel unit 200, respectively. More specifically, according to one embodiment of the invention, a plate 210 forming the left side of the tunnel unit 200 and a plate 220 forming the right side of the tunnel unit 200 may be respectively coupled to the conveyance unit 100 to support a plate 230 forming the upper side of the tunnel unit 200, a plate 240 forming the front side of the tunnel unit 200, and a plate 250 forming the rear side of the tunnel unit 200. Further, according to one embodiment of the invention, the plate 230 forming the upper side of the tunnel unit 200 may be coupled to the plate 210 forming the left side of the tunnel unit 200 and the plate 220 forming the right side of the tunnel unit 200, and may be disposed at a position facing the conveyance unit 100 (or the upper side of the conveyance unit 100). Further, according to one embodiment of the invention, the plate 240 forming the front side of the tunnel unit 200 and the plate 250 forming the rear side of the tunnel unit 200 may be respectively coupled to the plate 210 forming the left side of the tunnel unit 200, the plate 220 forming the right side of the tunnel unit 200, and the plate 230 forming the upper side of the tunnel unit 200. That is, according to one embodiment of the invention, the tunnel unit 200 may be formed in the shape of a box with an open bottom to surround at least a part of the conveyance unit 100.

Meanwhile, according to one embodiment of the invention, a vertical length L1 of the plate 240 forming the front side of the tunnel unit 200 (or the plate 250 forming the rear side of the tunnel unit 200) may be shorter than a vertical length L2 of the plate 210 forming the left side of the tunnel unit 200 and the plate 220 forming the right side of the tunnel unit 200 (see FIG. 3). According to one embodiment of the invention, a space S corresponding to a difference L3 of the above lengths may be formed between the plate 240 forming the front side of the tunnel unit 200 (or the plate 250 forming the rear side of the tunnel unit 200) and the conveyance unit 100, and the space S may form an inlet (or outlet) of the tunnel unit 200.

Next, the door assembly 300 according to one embodiment of the invention may be disposed at each of the inlet and outlet of the tunnel unit 200 to open and close the inlet and outlet of the tunnel unit 200. Specifically, according to one embodiment of the invention, the door assembly 300 disposed at the inlet of the tunnel unit 200 may open and close the inlet of the tunnel unit 200 (i.e., the space S formed between the plate 240 forming the front side of the tunnel unit 200 and the conveyance unit 100). Further, according to one embodiment of the invention, the door assembly 300 disposed at the outlet of the tunnel unit 200 may open and close the outlet of the tunnel unit 200 (i.e., the space S formed between the plate 250 forming the rear side of the tunnel unit 200 and the conveyance unit 100).

More specifically, according to one embodiment of the invention, the door assembly 300 disposed at the inlet of the tunnel unit 200 and the door assembly 300 disposed at the outlet of the tunnel unit 200 may take turns to open and close the tunnel unit 200. That is, according to one embodiment of the invention, the direction of movement of the door assembly 300 disposed at the inlet of the tunnel unit 200 may differ from the direction of movement of the door assembly 300 disposed at the outlet of the tunnel unit 200. For example, when the door assembly 300 disposed at the inlet of the tunnel unit 200 closes the inlet of the tunnel unit 200 (i.e., the space S formed between the plate 240 forming the front side of the tunnel unit 200 and the conveyance unit 100), the door assembly 300 disposed at the outlet of the tunnel unit 200 may open the outlet of the tunnel unit 200 (i.e., the space S formed between the plate 250 forming the rear side of the tunnel unit 200 and the conveyance unit 100). As another example, when the door assembly 300 disposed at the inlet of the tunnel unit 200 opens the inlet of the tunnel unit 200 (i.e., the space S formed between the plate 240 forming the front side of the tunnel unit 200 and the conveyance unit 100), the door assembly 300 disposed at the outlet of the tunnel unit 200 may close the outlet of the tunnel unit 200 (i.e., the space S formed between the plate 250 forming the rear side of the tunnel unit 200 and the conveyance unit 100).

Meanwhile, according to one embodiment of the invention, the door assembly 300 disposed at the inlet of the tunnel unit 200 and the door assembly 300 disposed at the outlet of the tunnel unit 200 may comprise the same components, i.e., a guide frame unit 310, an inner door 320, an outer door 330, and a drive unit 340. Each of the components will be described below focusing on the door assembly 300 disposed at the inlet of the tunnel unit 200.

Configuration of the Door Assembly

Figure 4:
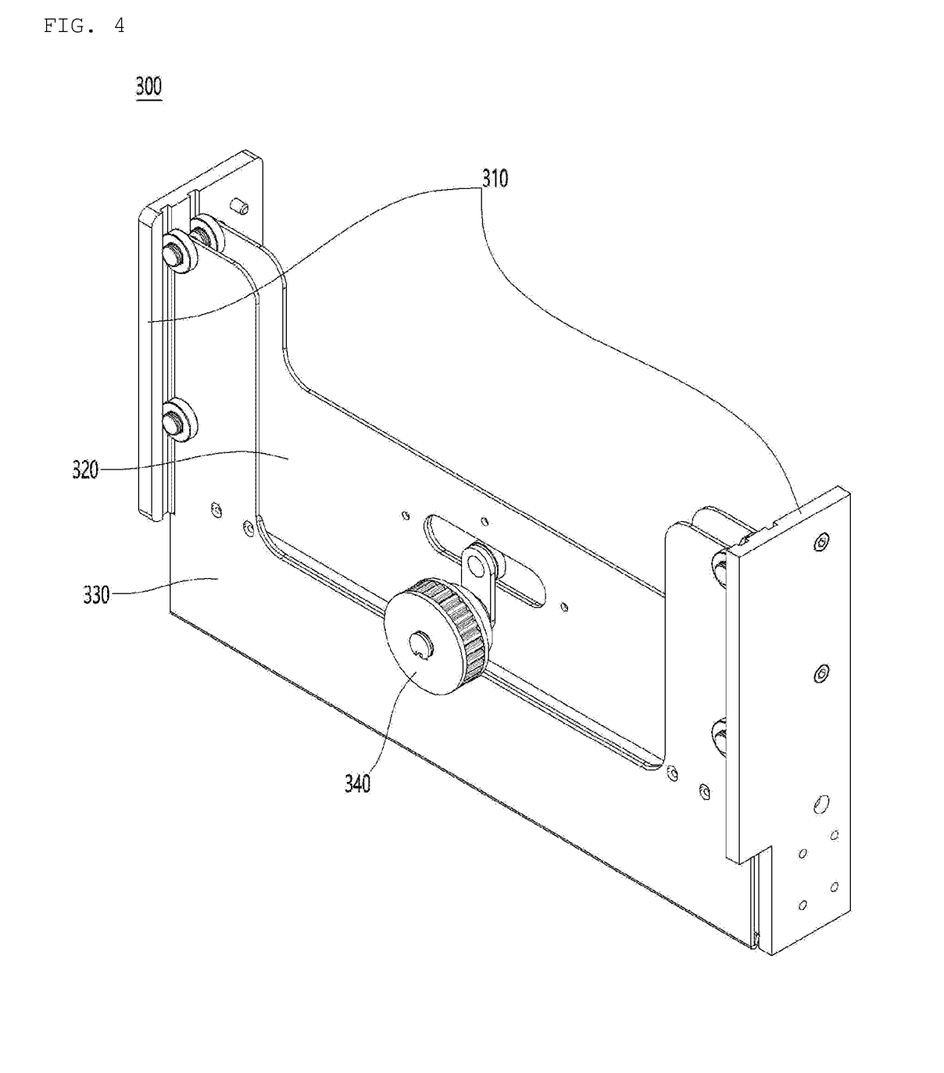
FIG. 4 illustrates a door assembly according to one embodiment of the invention.
Figure 5:
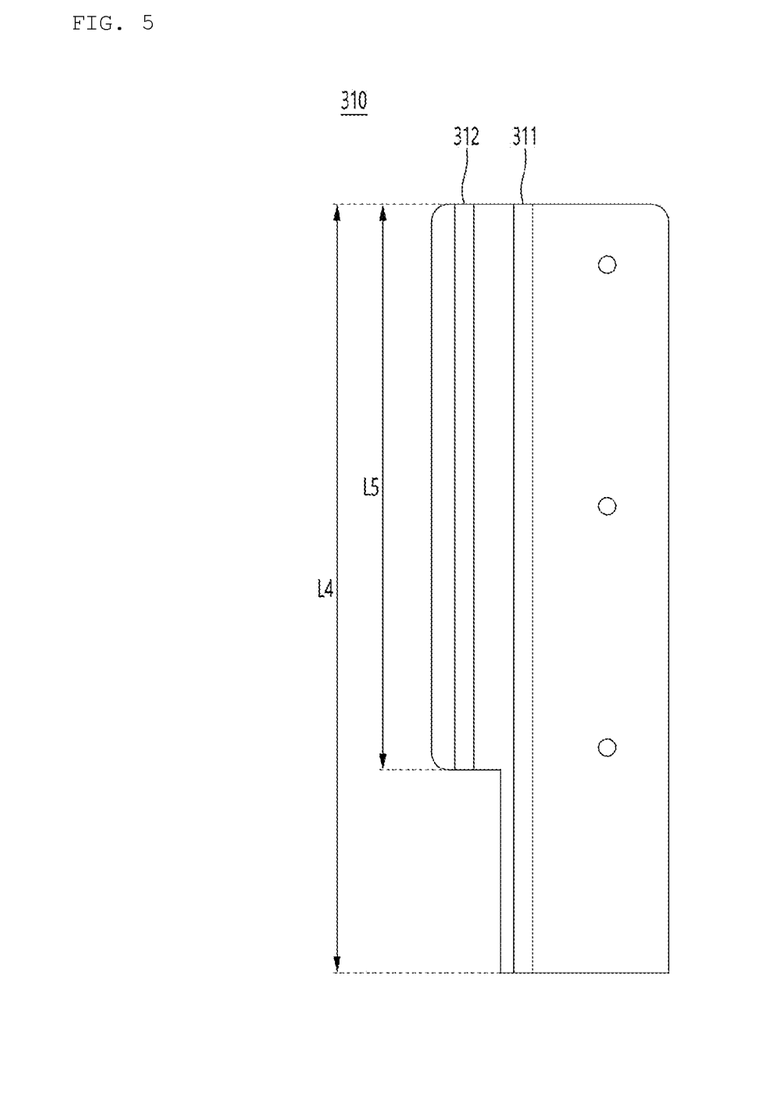
FIG. 5 illustrates a guide frame unit according to one embodiment of the invention.
Figure 6:
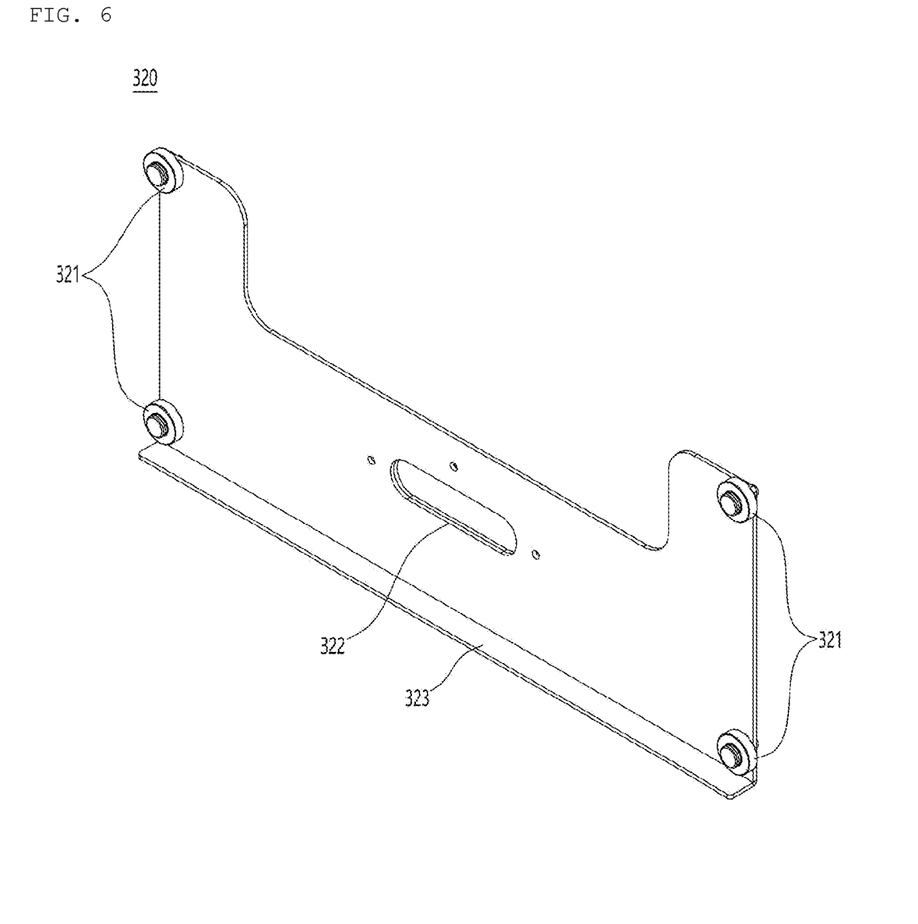
FIG. 6 illustrates an inner door according to one embodiment of the invention.
Figure 7:
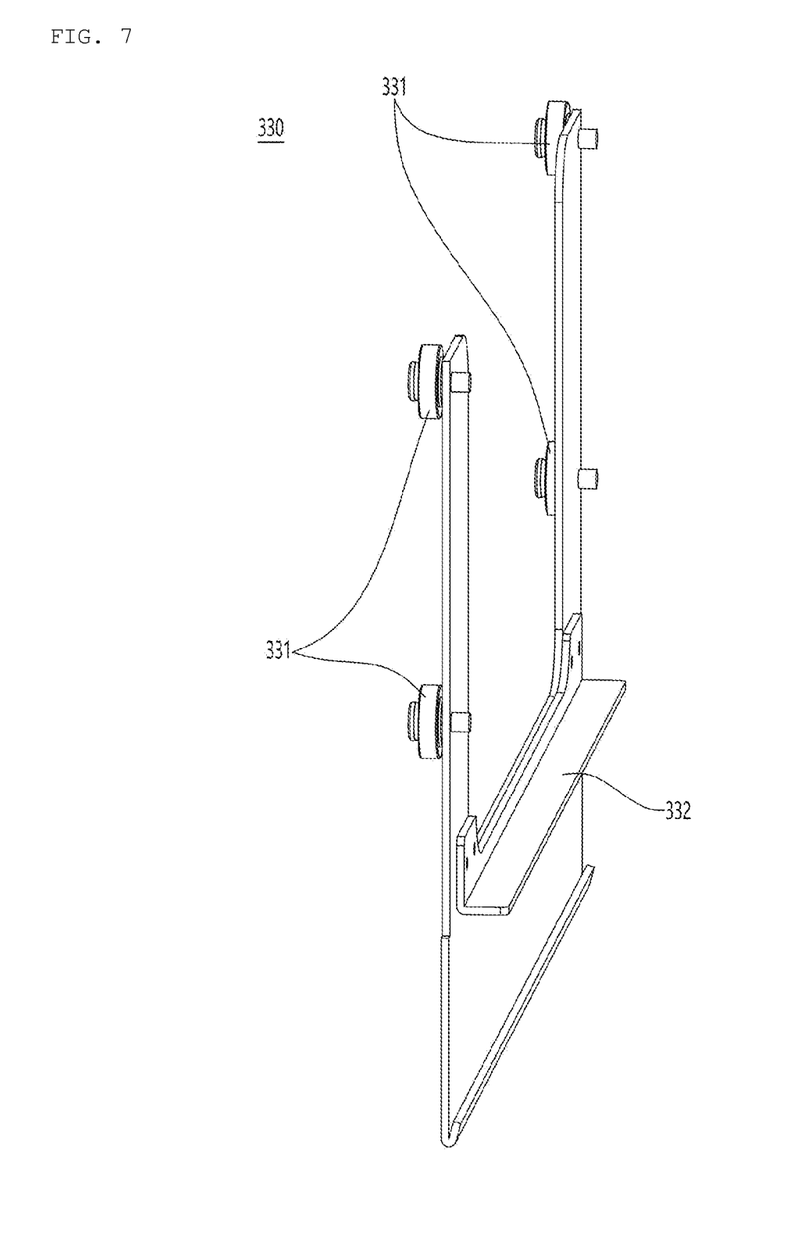
FIG. 7 illustrates an outer door according to one embodiment of the invention.
Figure 8:
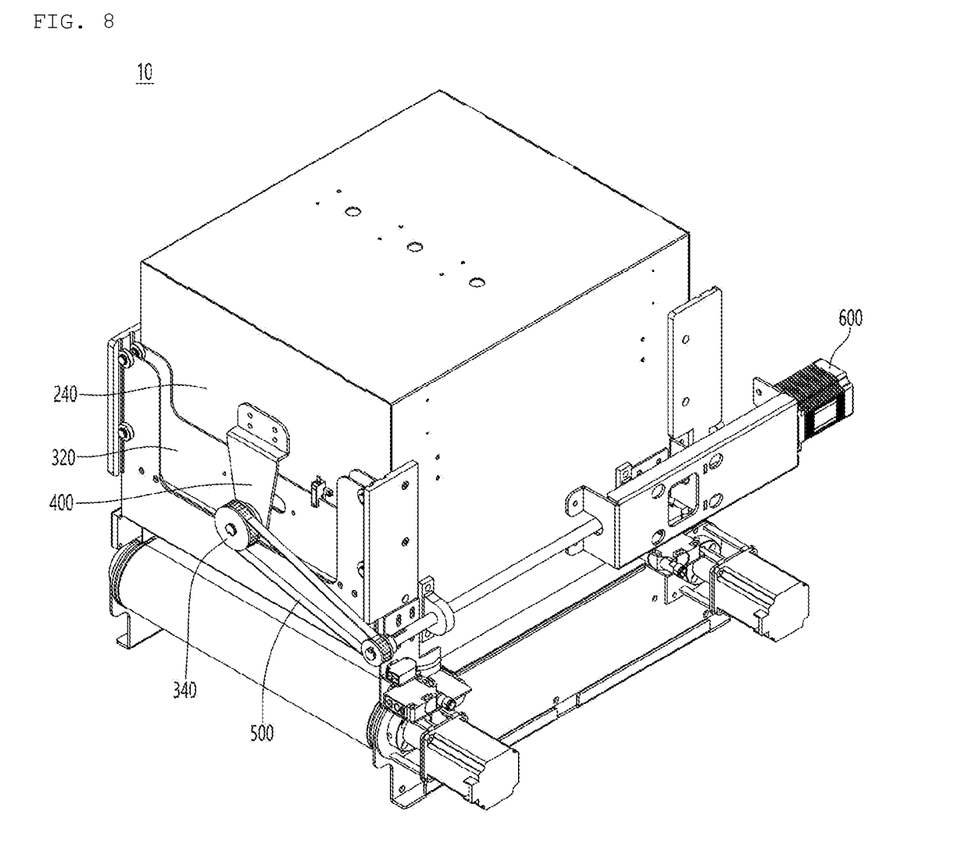
FIG. 8 illustrates a drive unit according to one embodiment of the invention.
Figure 9:
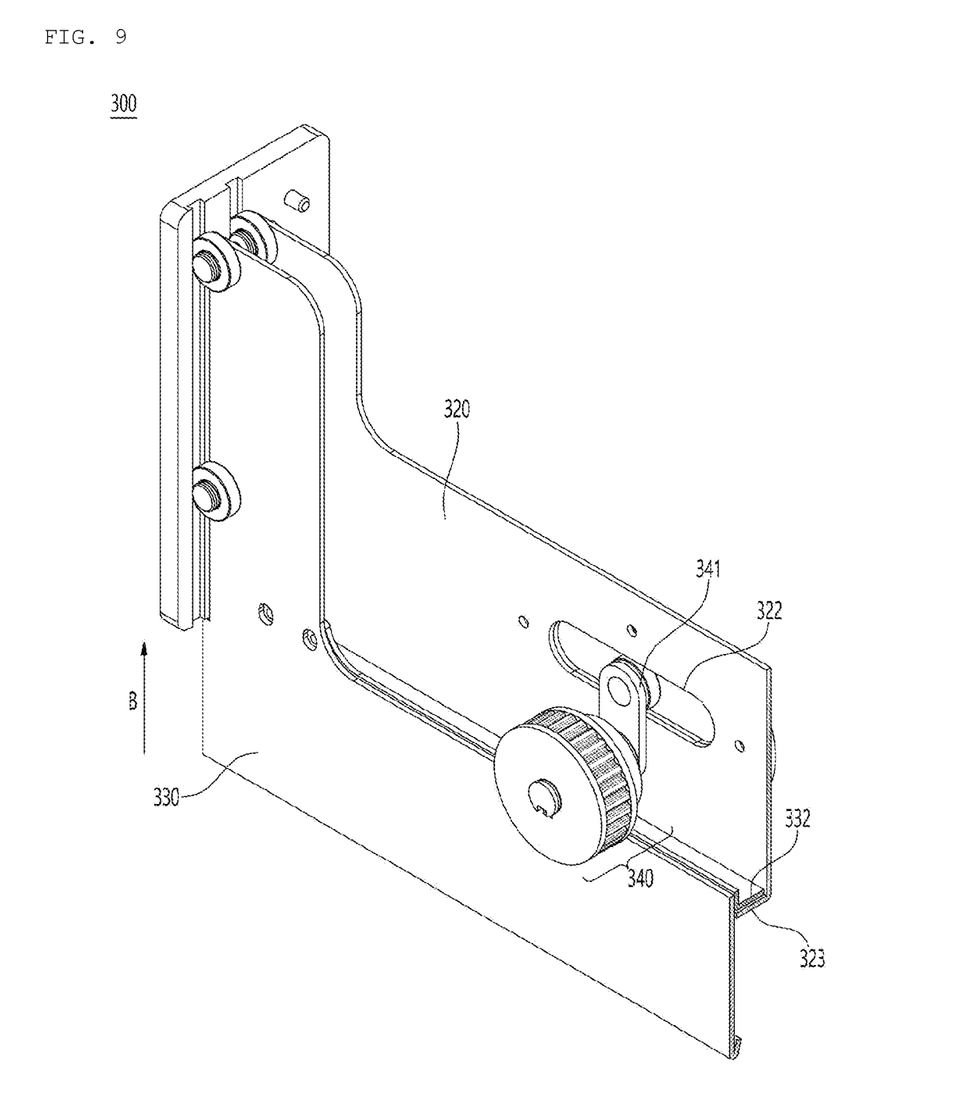
FIG. 9 illustrates a cross-section of the door assembly according to one embodiment of the invention.

FIG. 4 illustrates the door assembly 300 according to one embodiment of the invention, FIG. 5 illustrates the guide frame unit 310 according to one embodiment of the invention, and FIG. 6 illustrates the inner door 320 according to one embodiment of the invention. FIG. 7 illustrates the outer door 330 according to one embodiment of the invention, FIG. 8 illustrates the drive unit 340 according to one embodiment of the invention, and FIG. 9 illustrates a cross-section of the door assembly 300 according to one embodiment of the invention.

Referring to FIG. 4, the door assembly 300 according to one embodiment of the invention may comprise the guide frame unit 310, the inner door 320, the outer door 330, and the drive unit 340.

First, the guide frame unit 310 according to one embodiment of the invention may include a first guide track 311 and a second guide track 312 (see FIG. 5). Specifically, according to one embodiment of the invention, the first guide track 311 and the second guide track 312 may be spaced apart from and disposed in parallel with each other, and may be formed to extend in a direction perpendicular to a ground surface. Further, according to one embodiment of the invention, a vertical length L5 of the second guide track 312 may be shorter than a vertical length L4 of the first guide track 311. Specifically, according to one embodiment of the invention, a difference between the vertical length L5 of the second guide track 312 and the vertical length L4 of the first guide track 311 may be caused by a second locking part 332 being located above a first locking part 323 as will be described later. According to one embodiment of the invention, the second locking part 332 is located above the first locking part 323 so that the range in which a second wheel 331 may be installed on the outer door 330 is reduced (e.g., may be limited to an upper part of the second locking part 332), and when the outer door 330 is located at the lowest point in the range, the vertical length L5 of the second guide track 312 may be selected as the maximum length at which the second wheel 331 does not deviate from the second guide track 312. Thus, according to one embodiment of the invention, the vertical length L5 of the second guide track 312 may be shorter than the vertical length L4 of the first guide track 311.

Meanwhile, according to one embodiment of the invention, the guide frame unit 310 may be formed as a pair, and the pair of guide frame units 310 may be disposed such that the surfaces on which the first guide track 311 and the second guide track 312 are formed to face each other (see FIG. 4).

Next, the inner door 320 according to one embodiment of the invention may be disposed to be upwardly and downwardly movable along the first guide track 311 (see FIGS. 4 and 6). Specifically, according to one embodiment of the invention, a first wheel 321 may be formed at each of the upper left, lower left, upper right, and lower right of the inner door 320, and the inner door 320 may move upwardly and downwardly along the first guide track 311 as the first wheel 321 is engaged with the first guide track 311.

Meanwhile, the inner door 320 according to one embodiment of the invention may include a hole 322 and the first locking part 323. Specifically, according to one embodiment of the invention, the hole 322 to which the drive unit 340 is inserted (specifically, drivably coupled) may be formed at a middle part of the inner door 320, and the first locking part 323 protruding in a first direction (which may be, for example, a direction from the inner door 320 to the outer door 330, and specifically a direction perpendicular to the inner door 320) may be formed at a lower end part of the inner door 320. According to one embodiment of the invention, the inner door 320 may be formed in the shape of "]" when viewed from the side as the first locking part 323 is formed.

Next, the outer door 330 according to one embodiment of the invention may be disposed to be upwardly and downwardly movable along the second guide track 312 (see FIGS. 4 and 7). Specifically, according to one embodiment of the invention, the second wheel 331 may be formed at each of the upper left, middle left, upper right, and middle right of the outer door 330, and the outer door 330 may move upwardly and downwardly along the second guide track 312 as the second wheel 331 is engaged with the second guide track 312.

Meanwhile, the outer door 330 according to one embodiment of the invention may include the second locking part 332. Specifically, the outer door 330 according to one embodiment of the invention may be provided with the second locking part 332 protruding in a second direction (which may be, for example, a direction from the outer door 330 to the inner door 320, and specifically a direction perpendicular to the outer door 330) from above a point at which the first locking part 323 is formed on the inner door 320. Here, according to one embodiment of the invention, a sum of the maximum length of protrusion of the first locking part 323 and the maximum length of protrusion of the second locking part 332 may be greater than a distance between the inner door 320 and the outer door 330. According to one embodiment of the invention, the outer door 330 may be formed in the shape of "⊢" when viewed from the side as the second locking part 332 is formed.

Next, the drive unit 340 according to one embodiment of the invention may move the inner door 320 upwardly and downwardly. Specifically, according to one embodiment of the invention, the drive unit 340 may be supported by a fixing unit 400 coupled to the plate 240 forming the front side of the tunnel unit 200, and may be connected to a timing belt 500 to be drivably coupled to a motor 600 (see FIG. 8). According to one embodiment of the invention, the drive unit 340 may receive a driving force from the drivably coupled motor 600 and move the inner door 320 upwardly and downwardly on the basis of the driving force of the motor 600.

More specifically, according to one embodiment of the invention, a rotating part 341 included in the drive unit 340 may be inserted to the hole 322 formed on the inner door 320, and the rotating part 341 may rotate in a predetermined direction (e.g., clockwise or counterclockwise) according to the drive of the motor 600 (see FIG. 9). Here, according to one embodiment of the invention, the inner door 320 may move downwardly when the rotating part 341 rotates from the 12 o'clock position to the 6 o'clock position, and the inner door 320 may move upwardly when the rotating part 341 rotates from the 6 o'clock position to the 12 o'clock position. According to one embodiment of the invention, the inner door 320 may be located at the lowest point (i.e., in a closed state) when the rotating part 341 is located at the 6 o'clock position, and the inner door 320 may be located at the highest point (i.e., in an open state) when the rotating part 341 is located at the 12 o'clock position.

Meanwhile, according to one embodiment of the invention, in response to the inner door 320 moving upwardly and downwardly according to the rotation of the rotating part 341 as described above, the outer door 330 may move upwardly and downwardly in a state in which an upper side of the first locking part 323 and a lower side of the second locking part 332 contact each other. That is, according to one embodiment of the invention, the outer door 330 may move upwardly and downwardly on the basis of the locking structure between the first locking part 323 and the second locking part 332 (i.e., the structure in which the upper side of the first locking part 323 and the lower side of the second locking part 332 contact each other) while the outer door 330 is not directly coupled or interlocked with the drive unit 340.

Specifically, according to one embodiment of the invention, when the rotating part 341 rotates from the 12 o'clock position to the 6 o'clock position, the inner door 320 may move downwardly and the outer door 330 may also move downwardly in a state in which the upper side of the first locking part 323 and the lower side of the second locking part 332 contact each other (specifically, in a state in which gravity is downwardly applied to the second locking part 332 due to the weight of the outer door 330 so that the lower side of the second locking part 332 contact the upper side of the first locking part 323). Here, according to one embodiment of the invention, when the rotating part 341 is located at the 6 o'clock position, the outer door 330 is also located at the lowest point like the inner door 320, and at this time the inlet (or outlet) of the tunnel unit 200 may be closed by the inner door 320 and the outer door 330.

Further, according to one embodiment of the invention, when the rotating part 341 rotates from the 6 o'clock position to the 12 o'clock position, the inner door 320 may move upwardly and the outer door 330 may also move upwardly in a state in which the upper side of the first locking part 323 and the lower side of the second locking part 332 contact each other (specifically, the upper side of the first locking part 323 and the lower side of the second locking part 332 contact each other as the inner door 320 moves upwardly, and the outer door 330 may move upwardly as the first locking part 323 pushes the second locking part 332 upwardly). Here, according to one embodiment of the invention, when the rotating part 341 is located at the 12 o'clock position, the outer door 330 is also located at the highest point like the inner door 320, and at this time the inlet (or outlet) of the tunnel unit 200 may be opened by the inner door 320 and the outer door 330.

Meanwhile, according to one embodiment of the invention, the outer door 330 may move freely (specifically, move upwardly) in response to an external force being applied since it is not directly coupled or interlocked with the drive unit 340. For example, the upper side of the first locking part 323 and the lower side of the second locking part 332 may not contact each other in response to an external force being applied to the outer door 330 in a direction opposite to a ground surface (i.e., direction B in FIG. 9), and the outer door 330 may be separated from the inner door 320 to move upwardly. In particular, according to one embodiment of the invention, when the rotating part 341 is located at the 6 o'clock position so that both the inner door 320 and the outer door 330 are located at the lowest point (i.e., when the inlet or outlet of the tunnel unit 200 is closed), the upper side of the first locking part 323 and the lower side of second locking part 332 may not contact each other in response to an external force being applied to the outer door 330 in a direction opposite to the ground surface, and the outer door 330 may be separated from the inner door 320 to move upwardly.

That is, according to one embodiment of the invention, even when a user's hand is pinched between the outer door 330 and the conveyance unit 100, the user may easily remove the hand from under the outer door 330 by applying a force in a direction opposite to the ground surface, and thus safety may be further enhanced while the user uses the object collection apparatus 10.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A door assembly comprising:
   a guide frame unit including a first guide track and a second guide track spaced apart from and disposed in parallel with the first guide track;
   an inner door disposed to be upwardly and downwardly movable along the first guide track and provided with a first locking part protruding in a first direction at a lower end;
   an outer door disposed to be upwardly and downwardly movable along the second guide track and provided with a second locking part protruding in a second direction from above a point at which the first locking part is formed; and
   a drive unit configured to move the inner door upwardly and downwardly,
   wherein the second locking part is formed to contact the first locking part as the inner door moves upwardly, and
   wherein the first direction is a direction from the inner door to the outer door, and the second direction is a direction from the outer door to the inner door.

2. The door assembly of claim 1, wherein the first guide track and the second guide track are formed to extend in a direction perpendicular to a ground surface.

3. The door assembly of claim 1, wherein a length of the second guide track is shorter than a length of the first guide track.

4. The door assembly of claim 1, wherein a sum of a maximum length of protrusion of the first locking part and a maximum length of protrusion of the second locking part is greater than a distance between the inner door and the outer door.

5. The door assembly of claim 1, wherein in response to the inner door moving upwardly and downwardly, the outer door moves upwardly and downwardly in a state in which an upper side of the first locking part and a lower side of the second locking part contact each other.

6. An object collection apparatus having a door assembly, comprising:
   a conveyance unit configured to form a path through which an object moves;
   a tunnel unit formed at an upper part of the conveyance unit to surround at least a part of the conveyance unit; and
   a plurality of door assemblies each of which is disposed at an inlet and an outlet of the tunnel unit to open and close the inlet and outlet of the tunnel unit,
   wherein the door assembly comprises:
   a guide frame unit including a first guide track and a second guide track spaced apart from and disposed in parallel with the first guide track;
   an inner door disposed to be upwardly and downwardly movable along the first guide track and provided with a first locking part protruding in a first direction at a lower end;
   an outer door disposed to be upwardly and downwardly movable along the second guide track and provided with a second locking part protruding in a second direction from above a point at which the first locking part is formed; and
   a drive unit configured to move the inner door upwardly and downwardly, and wherein the second locking part is formed to contact the first locking part as the inner door moves upwardly, and
wherein the first direction is a direction from the inner door to the outer door, and the second direction is a direction from the outer door to the inner door.

7. The object collection apparatus of claim 6, wherein a direction of movement of the door assembly disposed at the inlet of the tunnel unit differs from a direction of movement of the door assembly disposed at the outlet of the tunnel unit.

\* \* \* \* \*